United States Patent [19]

Njos et al.

[11] 4,007,371

[45] Feb. 8, 1977

[54] ELECTRIC IMMERSION HEATER FOR STOCK TANKS

[76] Inventors: Lester B. Njos; Gordon L. Lamb, both of Rhame, N. Dak. 58651

[22] Filed: Dec. 3, 1974

[21] Appl. No.: 529,044

Related U.S. Application Data

[63] Continuation of Ser. No. 385,109, Aug. 2, 1973, abandoned.

[52] U.S. Cl. ............................... 219/523; 119/73; 126/367; 219/306; 219/318; 219/331; 219/337

[51] Int. Cl.² ...................... H05B 1/02; H05B 3/80; A01K 7/00; F24H 1/22

[58] Field of Search .......... 219/523, 437, 316, 318, 219/319, 337, 335, 336, 306, 314, 331; 119/73; 126/360, 367, 368

[56] References Cited

UNITED STATES PATENTS

| | | | |
|---|---|---|---|
| 985,344 | 2/1911 | Harvie et al. | 219/523 X |
| 1,002,977 | 9/1911 | Farrington et al. | 219/523 |
| 1,818,808 | 8/1931 | Max | 219/523 |
| 1,953,994 | 4/1934 | Stone | 219/523 X |
| 2,128,350 | 8/1938 | Chacey | 219/523 |
| 2,146,402 | 2/1939 | Morgan | 219/523 X |
| 2,297,030 | 9/1942 | Snyder | 219/523 UX |
| 2,429,303 | 10/1947 | Apatow | 219/523 |
| 2,659,804 | 11/1953 | Dunn | 219/523 |
| 2,838,649 | 6/1958 | Snyder | 219/523 UX |
| 2,847,551 | 8/1958 | Staudt | 219/523 UX |
| 2,899,533 | 8/1959 | Farmer | 219/523 UX |
| 3,762,466 | 10/1973 | Bhasin | 219/523 X |

FOREIGN PATENTS OR APPLICATIONS

| | | | |
|---|---|---|---|
| 1,158,192 | 11/1963 | Germany | 219/523 |
| 451,081 | 8/1949 | Italy | 219/523 |
| 487,876 | 6/1938 | United Kingdom | 219/319 |

Primary Examiner—A. Bartis
Attorney, Agent, or Firm—Robert E. Kleve

[57] ABSTRACT

The invention comprises electrically heated cylinders to be placed immersed in the bottom of a tank of water. The heated cylinder is electrically heated by an electric heating element mounted within the heating cylinder. The heated cylinder has means to support the cylinder with one end slightly higher than horizontal from the other end. The upper end of the heating cylinder has radially directed outlet hole means directing water from within the cylinder out of the cylinder back into the water in the tank in at least three different directions. The three different directions are in a path laterally outward from the longitudinal axis of the cylinder in at least approximately 90 degree intervals to one another. The upper end of the cylinder has closure means to cause water within the cylinder to be directed out radially directed outlet means. The lower end of the cylinder has water inlet means whereby water may travel into the water inlet means along the heating element to be heated and travel out the radially directed outlet hole means in at least three different directions, an electric cord is provided having circuit wires from the surface to the heating element to engergize the heating element. A thermostatic switch is mounted to the cord at a location spaced away from the heated cylinder and near the surface of the water in the tank and the switch is connected to one of the current wires in the cord to control the action of the heating element.

1 Claim, 6 Drawing Figures

ELECTRIC IMMERSION HEATER FOR STOCK TANKS

This is a continuation of application Ser. No. 385,109, filed Aug. 2, 1973, now abandoned.

This invention relates to tank heaters.

It is an object of the invention to provide a novel inexpensive tank heater for electrically heating an outdoor water tank to keep the water in the tank from freezing during the winter.

It is another object of the invention to provide a novel tank heater having a heating cylinder with an electric heating rod there and adapted to be placed in the bottom of a tank and an electric cord extending from the heating cylinder out of the water with a thermostatic switch cylinder mounted along the electric cord and spaced along the electric cord away from the heating cylinder and near the surface of the water to regulate the heating rod by its reaction to temperatures of the water near the surface.

It is another object of the invention to provide a novel tank heating having an electric heating element mounted within the heating cylinder with the cylinder placed at an inclination at the bottom of the tank with openings in the lower end of the cylinder to allow water in the tank to enter through the lower end and circulate through the cylinder past the heating element, and with radial openings at the upper end to allow the water to travel out of the cylinder.

Further objects and advantages of the invention will become apparent as the description proceeds and when taken in conjunction with the accompanying drawing wherein.

Briefly stated, the invention comprises a tank heater for electrically heating a tank of water. The tank heater has an elongated heating cylinder adapted to be placed at the bottom of a tank of water at an angle with one end higher than the other end. The heating cylinder has a heating element therein. The heating cylinder has inlet holes at its bottom end and at least three radial outlet holes at its upper end with said heating cylinders being imperforate between the inlet holes and the outlet holes whereby water in the tank may travel into the heating cylinder through the outlet holes and travel along the heating element to be heated and then travel out of the heating cylinder through the radial outlet holes back into the water in the tank to heat the water in the tank. The tank heater has a three wire electric cord which cord has a pair of current wires and a ground wire. The current wires provide current to the heating element and the ground provides a connection from the metallic portion of the tank heater to the surface to provide a ground. A waterproof thermostatic switch apparatus is mounted to the electric cord at a location intermediate the length of the cord so as to be spaced away from the heating element and spaced away below the surface of the water in the tank. The thermostatic switch apparatus has a thermostatic switch therein which switch is connected to one of the current wires to control the actuation of the heating element.

Figure 1:
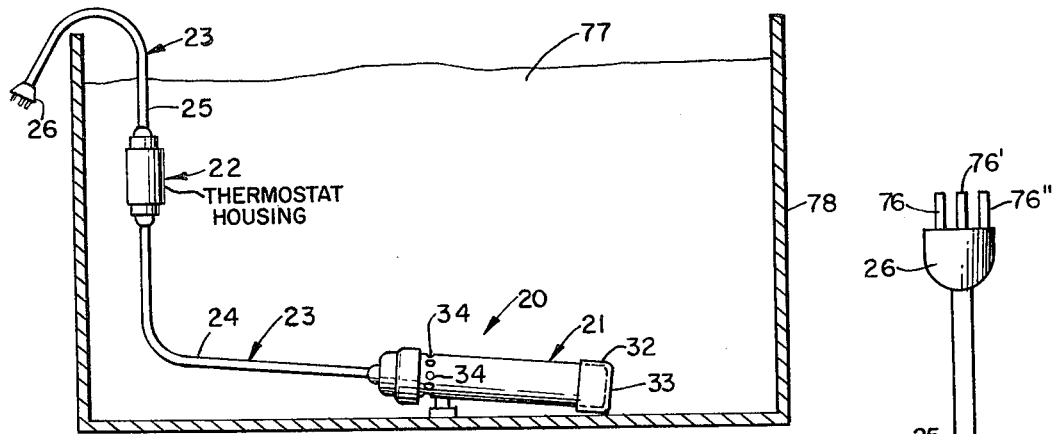
FIG. 1 is a side elevational view of the tank heater invention.
Figure 2:
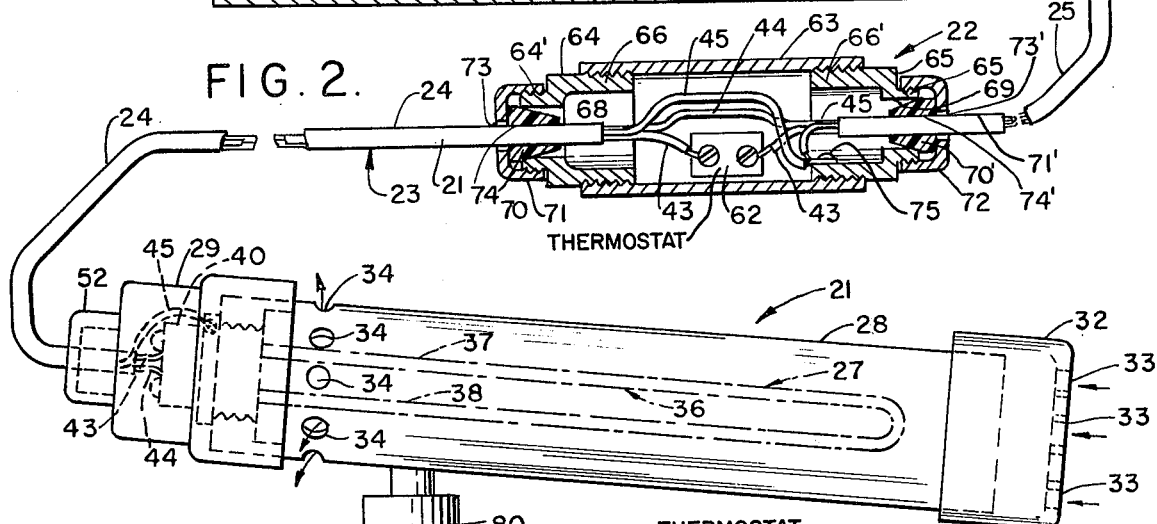
FIG. 2 is an enlarged side elevational view of the tank heater invention with portions broken away to reveal the interior construction.

Referring more particularly to the drawing, in FIG. 1, the tank heater invention 20 is illustrated as having a heating cylinder member 21 and a thermostatic switch cylinder member or thermostat housing 22. An electric cord 23 is divided into two sections 24 and 25. One section 24 of cord 23 is mounted at one to the heating cylinder 21 and the other end mounted to the switch cylinder 22. The cord section 25 of cord 23 has one end mounted to the thermostatic switch cylinder member 22 and its other end mounted to a conventional electric three prong plug 26.

The heating cylinder has a conventional heating element 27 mounted in the sleeve 28. An end cylinder 29, with internal threading along its enlarged shoulder 30, is threaded onto the front end 31 of the sleeve 28 in watertight relation so that the end cap 29 forms a relatively small chamber in the front of the sleeve 28. An end cap 32 is fixed over the other end of the sleeve 28 by welding or threaded attachment. The end cap 32 has a plurality of bores 33 therethrough.

The sleeve 28 has a plurality of radial bores 34 therethrough extending about its front end 31. The sleeve 28 has an annular disc-like collar portion 28' at its front end with a reduced threaded bore 35 through the collar portion 28'.

The heating element 27 is conventional and has a U-shaped electric heating rod 36. The legs 37 and 38 of the heating rod 36 are mounted in a cylindrical plastic plug 40 spacing one leg of the heating element from the other leg.

The heating rod 36 has a conventional heating coil extending through the metal sleeve of the rod 36, with the ends of the heating coil terminating in metal rods 37' and 38' which metal rods 37' and 38' are also mounted onto the plug 40 with the plastic of the plug 40 electrical insulating one rod in relation to the other and to the other components. The rod 37', however, is electrically connected to a metal screw 41 threaded into the plug 40. The rod 38' is electrically connected to a metal screw 42 threaded into the plug 40 which plug construction is conventional.

The electric cord 23 has three wires 43, 44, and 45. The electric wires 43 and 44 provide the electrical circuit or current connection for energizing the heating coils of the heating element 27. The wire 45 provides a ground connection for the heating cylinder 21 and a ground for the switch cylinder 22.

The screw 41 engages and electrically connects the wire 43 of the cord 23 to the metal rod 37', to thereby provide an electrical connection between one end of the electric heating coil of the element 27 and the wire 43 of the cord, through the metal rod 37'. The screw 42 engages and electrically connects to the wire 44 at the cord 23 to the rod 38' to provide an electrical connection between the other end of the electrical heating coil of the element 27 and the wire 44 of the cord 23 through the rod 38'.

The ground wire 45 of the electrical cord 23 is mounted by a screw 46 to a metal plate portion 47 of the plug 40 to provide a ground for the heating cylinder 22. The screw 46 also abuts and directly engages the steel collar portion 28' of the steel sleeve 28 to complete the ground. The screw 46 is screwed into the metal plate portion. The metal plate portion 47 surrounds the plastic cover of the plug and the plastic cover of the plug surrounds the ends of the sleeve of the heating coil to insulate the rods 37' and 38' from the portion 46 and insulate the ends 37' and 38' from one another.

Figure 3:
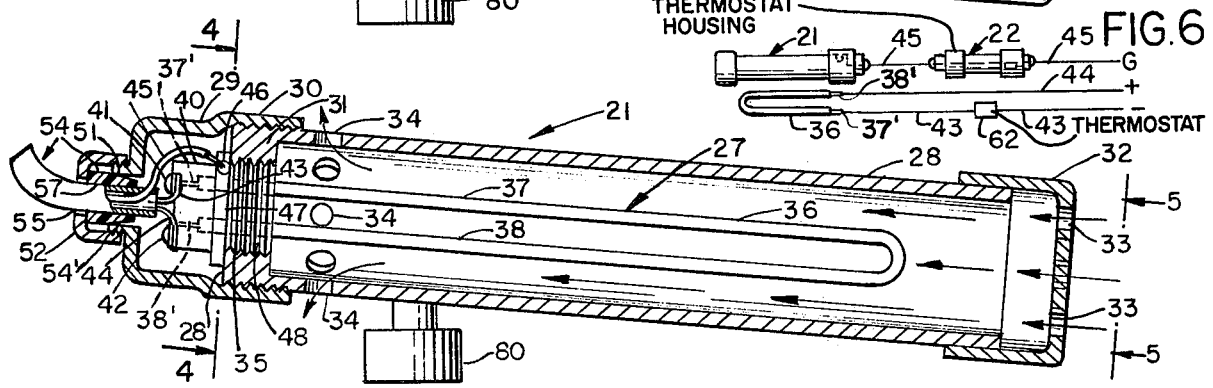
FIG. 3 is a longitudinal cut away view of the heating cylinder of the tank heater invention.
Figures 4, 5:
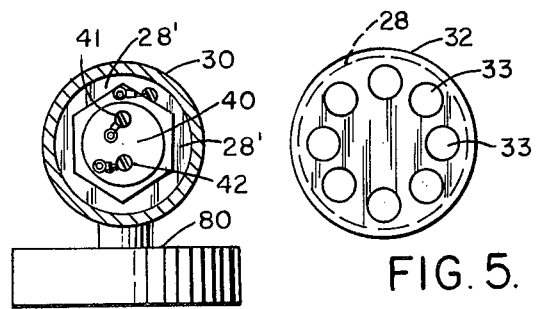
FIG. 4 is a cross-sectional view taken along line 4—4 of FIG. 3.
FIG. 5 is a view taken along line 5—5 of FIG. 3.

The heating element 27 is inserted into the sleeve 28 by inserting the U-rod portion 36 through the bore 35 in the collar portion 28' of the sleeve and then threading the threaded portion 48 of the plug 40 into the bore 35 until the plug portion 40 and U-rod portion 36 of the heating element are in their position shown in FIG. 3. When the heating element 27 is in its position shown in FIG. 3, the metal screw 46 abuts the collar portion 28' of the sleeve 28 to provide a ground connection between the ground wire 45 and sleeve 28 through the screw 46 to provide a ground for the heating cylinder 21.

The plug 40 may also have a rubber sealing ring at the inner end of the threaded portion of its plug to further seal the plug 40 to the collar of the sleeve.

The threaded portion 48 of the plug 40 may be made of metal and the plate portion 47 may also be made of metal. However, the projecting portion of the plug 40 wherein the sleeves of the heating element terminate and the connecting rods 37' and 38' project out of the sleeve and where the screws 41 and 42 are located, is made of plastic to electrically insulate the coils and the wire connections to the screws which is an conventional construction.

The electric cord 23 has two sections 24 and 25.

The metal end cap or end cylinder 29, which is threaded over the front end 31 of the sleeve 28 and surrounds the plug portion 40 of the heating element. The end cap 29 has a bore 51 in the front therethrough.

An annular sealing cap 52 is threaded onto a reduced shoulder portion 53 of the end cylinder 29 and presses an annular rubber sealing ring 54 against the inside surface of the bore 51 of the end cylinder 29, by the tapered annular frusto conical surfaces 54' engaging against the edge of the bore. It also presses against the protective sleeve 55 of the cord 23 to provide a watertight seal between the cord 23 and the end cylinder 29.

The annular sealing cap 51 with a bore 55 therethrough and the rubber sealing ring 54 has a center bore 57 therethrough.

One end of the section 24 of the cord 23 passes through the bore 55 in the sealing cap, through the bore 57 in the sealing ring, and through the bore 51 in the end cylinder 29, to the plug 40; where the wires 43, 44 and 45 are attached to the screws 41, 42, and 46 of the plug of the heating element.

The end cap or cylinder 29 being threaded onto the sleeve 28 in watertight relation, the watertight seal between the plug 40 and collar portion 28' of the sleeve, and the watertight seal between the sleeve 55 of the cord 23 and the end cap or cylinder 29 provides a watertight chamber for the inner ends of the wires 43, 44, and 45 of the electric cord 23 and the electrical connection on the plug 40 by the screws 41, 42, and 46.

The thermostatic switch cylinder 22 housing, container, or enclosure has a thermostatic switch or thermostat 62 mounted inside the cylinder sleeve 63 of the switch cylinder. A pair of steel end cylinders 64 and 65 are threadably attached to the inside surfaces 66 and 66' at the opposite ends of the sleeve 63 in watertight relationship. The end cylinders 64 and 65 have each bores 68 and 69, respectively, therethrough. A pair of rubber rings 70 and 70' are inserted into the bores 68 and 69 of the end cylinders. A pair of end caps 71 and 72 are threadably attached to the reduced shoulder 64' and 65' of the end cylinder. The end caps 71 and 72 have bores 73 and 73', therethrough. Ends 71' and 71' of the sections 25 and 24 of the cord 23 are inserted into the bores 73 and 73' of the end caps and through the bores 74 and 74' of the sealing rings 70 and 71 through the bores 68 and 69 in the end cylinders.

The end caps 71 and 72 when threadably attached to the reduced shoulder 64' and 65 of the end cylinder press the rubber rings 70 and 70' against the inside surface of the end cylinders forming the bores 68 and 69 and presses the rings 70 and 70' against the protective sleeve 55 of the cord 23, to provide a watertight seal between the sections 24 and 25 of the thermostatic switch cylinder 22 and provides a watertight chamber inside the thermostatic switch cylinder 22 for the thermostatic switch 62.

The wires 45 of sections 24 and 25 of the cord 23 are attached in series to the thermostatic switch thermostatic 62 inside the sleeve of the thermostatic switch cylinder. The thermostatic switch acts to open the circuit through wires 43 and 44 providing current to the heating rod, when the temperature in the water in the tank surrounding the thermostatic switch cylinder drops below a certain level. The thermostatic switch will react, since the temperature inside the thermostatic switch cylinder will also drop and will close the circuit through lines 43 nd 44 to energize the heating rod. When the temperature in the water surrounding the thermostatic switch cylinder rises above a certain level, the thermostatic switch will react since the temperature inside the thermostatic switch cylinder will also rise, and will open the circuit through lines 43 and 44 to energize the heating rod.

The wire 44 simply passes through the thermostatic switch cylinder, by the wires 44 of sections 24 and 25 being connected together inside the sleeve of the thermostatic switch cylinder.

The ground wire 45 passes through the thermostatic switch cylinder. However, the wires 45 of sections 24 and 25 are connected together by a screw 75, threaded into the end cylinder 65 of the thermostatic switch cylinder which hold the wires 45 of sections 24 and 25 together also holds the wires 45 against the end cylinder of the thermostatic switch cylinder to provide a ground running from the plug 26 through the thermostatic switch cylinder to the heater cylinder, and also provide a ground for the thermostatic switch cylinder.

The other ends of the wires 43 and 44 of section 25 of the cord are mounted in prongs 76 and 76', respectively, of the end plug, which in turn are connected to a source of electric current. The other end of wire 45 of section of the cord is mounted in prong 76" of the end plug which in turn is connected to a suitable ground.

OPERATION

The heating cylinder 20 is placed in the water 77 at the bottom of tank 78, as shown in FIG. 1. The cord 23 will be flexible with a watertight sleeve and will extend up and out of the water with the plug connected to a source of electric current and a suitable ground.

The thermostatic switch cylinder 22 will be positioned in the water 77 near the surface of the tank 78, as generally illustrated in FIG. 1. Consequently, the temperature of the water near the surface of the tank will regulate the activation and deactivation of the heating element by the reaction of the thermostatic switch located near the surface.

It is desirable that the heating element activation be regulated by the temperature in the water in the neighborhood of the surface of the tank. Since the water in the back of the tank could be above freezing while the water near the surface might be frozen. It is necessary that the water near the surface not be freezing so that animals may drink from the tank.

The cord section 24 of the cord 23 will be approximately 5 feet in length, so as to space the heating element in the heat cylinder sufficiently far enough away from the thermostatic switch in the thermostatic switch cylinder. It has been found that if the thermostatic switch is located too close to the heating element, it may turn off the heating element too soon. While the water immediately around the heating element may be unfrozen or liquid, or melted, or above freezing, the rest of the water in the tank or a vast amount of the water in the tank further away from the heating element may still be frozen and it is desirable that all the water in the tank or at least the upper portions of the water in the tank be above freezing.

Since heated water tends to rise in relation to colder water surrounding it, the water in the tank near the heating element when the heating element is energized will enter the sleeve through the holes 33 in the end cap of the heating cylinder and move upward along inside of the sleeve and past the heating rod 36 of heating element 23 and move radially out the radial holes 34 at the upper end of the sleeve in a spray-like manner. The water will be heated as it moves past the heating rod 36.

It is desirable that the holes at the upper end of the sleeve be located evenly and radially about the sleeve, so that the water moving along inside of the sleeve past the heating element for heating will move out of the radial holes in a radial spray-like action for better circulation of the heated water with the rest of the water in the tank.

Also, it is desirable that the holes 33 and 34 be sufficiently larger so that an adequate amount of water can travel through the sleeve of the heating cylinder via holes 33 and 34 to adequately heat the water in the tank in a sufficiently even manner, by providing adequate circulation of the water through the sleeve.

A horizontal beam member 80 is fixed to the underside of the sleeve of the heating cylinder so that the heating cylinder sits at an upward angle, as illustrated, in FIG. 1, when in operation so as to assume that the direction of flow of water through the sleeve of the heating element will be by the water entering through bores 33 and once heated by the heating element will move upward along the inclined sleeve and out the radial holes 34 at the upper end of the sleeve.

It has been found that the invention employs a conventional heating element which adequately heats a tank of water 10 feet square and 2 feet in height so as to maintain all the water in the tank above freezing temperatures.

Thus, it will be seen that a novel tank heater invention has been provided which can be easily and simply manufactured and easily and simply installed and operated, and which will adequately and effectively heat the water in a tank to keep the water from freezing during the winter months so that animals can drink from the water tank.

It will be obvious that various charges and departures may be made to the invention without departing from the spirit thereof and accordingly it is not intended that the invention be limited to that specifically described in the specification or as illustrated in the drawing, but only as set forth in the appended claims wherein:

We claim:

1. A tank heater device comprising a heating cylinder means, said heating cylinder means comprising an elongated hollow cylinder adapted to be placed immersed in the bottom of a water tank, means for supporting said cylinder on the floor of said tank at a small acute angle with one end slightly higher than horizontal to the other end, said heating cylinder means having an electric heating element inside of said cylinder, said upper end of said cylinder having radially directed outlet hole means directing the water from within the cylinder out of the cylinder and back into the water in the tank in at least three different directions, which directions are laterally outward from the longitudinal axis of the cylinder at approximately 90° intervals to one another, sid upper end of said cylinder having closure means to cause the water within the upper end of the cylinder to be directed out through the radially directed water outlet hole means, said lower end of said cylinder having water inlet hole means, said water inlet hole means and said water outlet hole means communicating directly with the water in the tank with said cylinder imperforate between said inlet and outlet hole means, wherein water in the tank may travel into the water inlet hole means at the lower end of the cylinder past the heating element to be heated by said element and travel out of said cylinder through the radially directed water outlet hole means after being heated in different directions radially, at least a three wire electric waterproof cord having a pair of current wires connected to the heating element and extending to the surface to energize the heating element, a thermostatic switch along and in the path of said electric cord spaced away from said heating cylinder and near the surfce of the water in the tank, and connected to at least one of said current wires of said electric cord to control the energization of the heating element, said electric cord also including a ground wire, said heating cylinder means having metallic portions, said ground wire being connected to said metallic portions at its one end and adapted to be connected to a ground at its other end to provide a ground for said heating cylinder means, said thermostatic switch and said at least one current wire where connected to said thermostatic switch being closed in a waterproof enclosure so as to be submersible in the water in the tank, said elongated cylinder having a wall adjacent one end of said cylinder dividing said cylinder into a small chamber and a relatively large main chamber, with said water inlet means and outlet means being located in said main chamber, a detachable cap means covering said one end of said cylinder, said wall having an opening, said heating element having an elongated heating rod with electrical connections to said heating rod being mounted in a plug at one end of said rod, said rod of said heating element projecting into said main chamber through said wall opening with said plug attached to said wall to form a watertight seal in the wall and with said electrical connections for said rod being located in said small chamber, said detachable cap means covering said one end of said cylinder to cover said electrical connections in said small chamber in watertight relation, said cap having an opening therethrough with said cord passing through said opening for electrical connections of its wires to said electrical connections of said heating element, means providing a watertight seal between said cord and said detachable cap means in the opening into said cap.

* * * * *